United States Patent [19]

Saggese

[11] Patent Number: 5,159,746
[45] Date of Patent: Nov. 3, 1992

[54] METHOD OF ASSEMBLING HEAVY MOTOR VEHICLES

[75] Inventor: Luigi Saggese, Turin, Italy
[73] Assignee: Iveco, Fiat S.p.A., Turin, Italy
[21] Appl. No.: 414,757
[22] Filed: Sep. 30, 1988

[30] Foreign Application Priority Data

Sep. 30, 1988 [IT] Italy .................. 67877 A/88

[51] Int. Cl.$^5$ .......................... B60R 27/00
[52] U.S. Cl. .......................... 29/467; 296/190; 296/197; 180/89.19
[58] Field of Search ............... 296/190, 196, 197, 193, 296/194; 180/89.12, 89.19; 29/467, 469

[56] References Cited

U.S. PATENT DOCUMENTS

| | | |
|---|---|---|
| 3,378,278 | 4/1968 | Froitzheim et al. ............ 296/190 X |
| 4,126,350 | 11/1978 | Briers et al. ................. 296/190 |
| 4,215,899 | 8/1980 | Schmidt et al. ............... 296/190 |
| 4,813,736 | 3/1989 | Schubert et al. .............. 296/190 |
| 4,842,326 | 6/1989 | Di Vito ..................... 296/197 X |

FOREIGN PATENT DOCUMENTS 247295 12/1987 European Pat. Off. ........... 296/190

OTHER PUBLICATIONS

Standardized Cabs and Bodies, Knapheide Wagon, Co. Jan., 1930.

Primary Examiner—Margaret A. Focarino
Assistant Examiner—Gary C. Hoge
Attorney, Agent, or Firm—Kane, Dalsimer, Sullivan, Kurucz, Levy, Eisele and Richard

[57] ABSTRACT

The cabs of the series, which are of different dimensions, each having a driver cab and a shield for shielding the front and sides of the vehicle frame. The shield is in the form of a continuous fascia disposed below the driver compartment, the height of this latter being the same for all vehicles of the series whereas the height of the fascia is different for the various vehicles of the series. Thus cabs of different overall heights are obtained by combining driver compartments of constant height with fascias of different height.

6 Claims, 1 Drawing Sheet

METHOD OF ASSEMBLING HEAVY MOTOR VEHICLES

BACKGROUND OF THE INVENTION

Cabs of heavy motor vehicles are known to comprise substantially a a pair of side panels each housing a door, a front panel, a rear panel and a roof panel. These panels, normally of sheet metal, are joined rigidly together by welding to define a rigid structure of high mechanical strength, to form the compartment for the vehicle driver. A floor panel also forms part of the cab and is shaped in such a manner as to form below it a housing for the upper part of the vehicle power unit. Said cab can be tilted relative to the vehicle frame about a transverse shaft positioned at the front of the frame, to give easy access to the power unit and to the main mechanical members of the vehicle.

Normally the lower parts of the cab front and side panels are shaped to shield the front and sides of the vehicle frame and some of the mechanical members connected to it. This shielding action is also partly provided by the bumper and side cab access footboards normally fixed to the vehicle frame.

The dimensions of cabs for heavy motor vehicles belonging to one and the same series but designed for the transportation of different loads vary according to the height of the vehicle axles from the ground and the dimensions of the power unit and other main mechanical members. Consequently the cabs of vehicles designed for transporting the larger loads are of larger size, and in particular have a larger overall height. This is a consequence mainly of the fact that in addition to forming a compartment for the driver, the cab must also shield the front and sides of the vehicle frame and main mechanical members, the vertical dimensions of which are greater than in the case of vehicles designed for transporting small loads. The result is that the height of the front, side and rear panels of a cab is greater in those vehicles designed for transporting the greater loads. Consequently the equipment necessary for constructing all the cabs required for use on a given series of heavy vehicles with capacities varying within a fairly wide range is considerable, complicated and very costly. In addition, the number of mechanical parts which have to be held in store to satisfy cab production and subsequent spares requirements is very large.

SUMMARY OF THE INVENTION

An object of the present invention is to provide a series of heavy vehicle cabs of different dimensions, and in particular of different overall heights, which obviates the aforesaid drawbacks by allowing all cabs of the series to be produced by simple low-cost equipment, and by dispensing with the need to stock a large number of parts to satisfy cab production and subsequent spares requirements.

A further object of the present invention is to provide a series of cabs of the indicated type in which the shielding of the front and sides of the vehicle frame and certain of the mechanical members connected to it is complete and is effected by screening means which satisfactorily integrate with the vehicle driver compartment.

These objects are attained by a series of heavy motor vehicle cabs of different dimensions and in particular of different overall heights, each cab containing a compartment for the vehicle driver. Each cab includes a pair of side panels each of which consists of a closed frame and a door, a front panel and a rear panel. The cab also includes shielding means for shielding the front and sides of the vehicle frame and certain of the mechanical members connected to it. The said shielding means are in the form of a continuous fascia which comprises a central portion disposed below said front panel and a pair of side portions each of which is disposed below a corresponding one of said side panels. The height of said compartment is the same for all cabs of the series and the height of said fascia is different for the various cabs of the series, so as to obtain cabs of different overall heights by combining cabs of constant height with fascias of different height.

BRIEF DESCRIPTION OF THE DRAWING

The present invention will be more apparent from the detailed description thereof given by way of example with reference to the accompanying drawing which shows in FIGS. 1 and 2 parts of two heavy motor vehicles designed for transporting different loads and equipped with cabs of the series according to the invention.

DETAILED DESCRIPTION OF THE INVENTION

Figure 1:
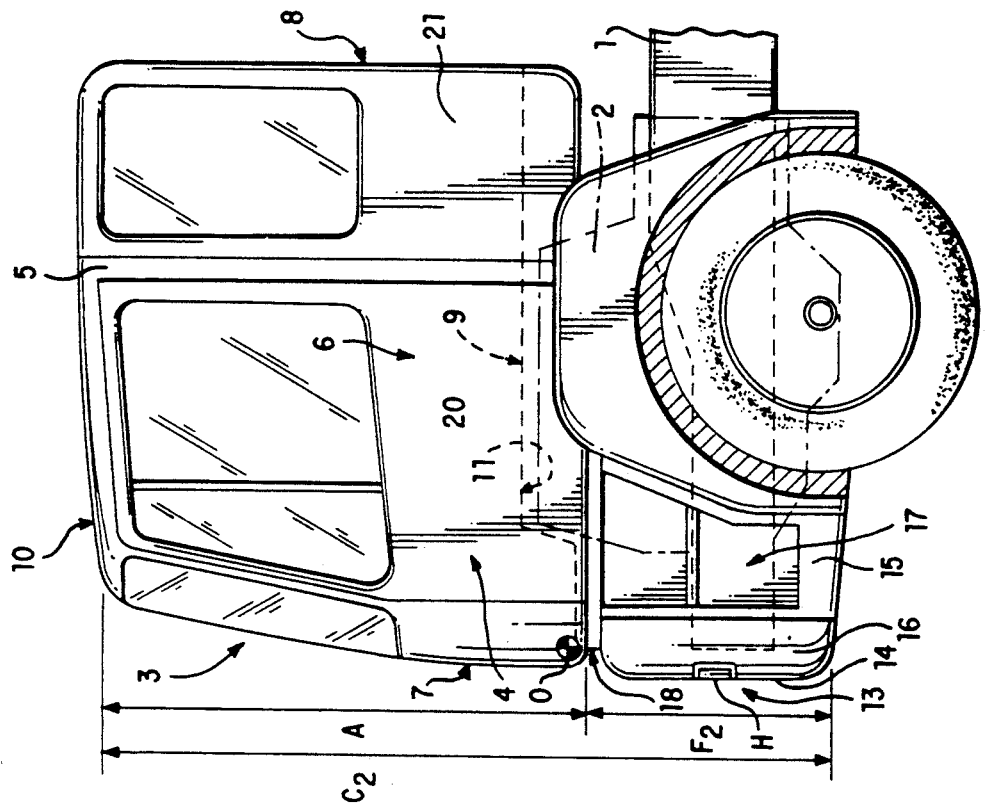
Figure 2:
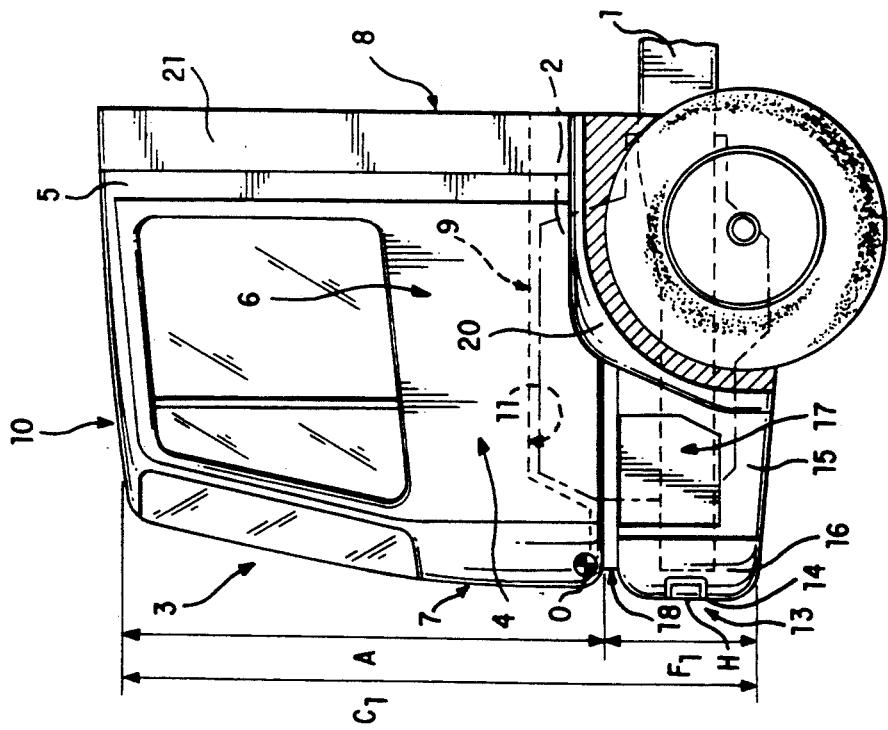

The motor vehicles on which the cabs of the series are mounted have different dimensions and in particular, as can be seen in the figure, the height of the shaft from the ground is different as are the vertical dimensions of the main mechanical members such as the frame 1 and the power unit 2.

Each cab of the series is provided with a compartment 3 for the vehicle driver, comprising substantially a pair of side panels 4 each of which consists of a closed frame 5 and a door 6, a front panel 7 and a rear panel 8. Said panels are of sheet metal and are joined together, for example by welding, to form a monolithic structure of high rigidity and mechanical strength. The cab also comprises a floor panel 9 and a roof panel 10 which delimit the cab at the bottom and top respectively. Specifically, the floor panel is shaped to form a housing 11 for the upper part of the power unit 2 and for some of the main vehicle members.

According to the invention the cab is also provided with shielding means for shielding the front and sides of the vehicle frame and certain of the mechanical members connected to it. Said shielding means are in the form of a continuous fascia 13 which comprises a central portion 14 disposed below the cab front panel 7 and a pair of side portions 15, each of which is disposed below a corresponding side panel 4.

The height of the driver compartment 3 of each cab of the series is the same, as is clear from the FIGURE, whereas the height of the fascia 13 is different for the various cabs of the series, so as to obtain cabs of different overall heights by combining driver compartments of constant height with fascias of different height. Consequently, as is clear from the figure, the height of the driver compartments 3 of the cabs of the two motor vehicles shown on the figure, indicated by A, is the same whereas the height of the corresponding fascias 13 is different and is indicated by $F_1$ and $F_2$ on the figure. Thus the overall cab height indicated in the two cases by $C_1$ and $C_2$ and respectively equal to $A+F_1$ and $A+F_2$ is different.

Whereas the driver compartment 3 can swivel relative to the vehicle frame 1 by being rotatable about a transverse shaft indicated on the figures by O, the continuous fascia 13 is fixed relative to the frame and is connected thereto in any convenient manner. The fascia 13 incorporates the bumper 16, the headlamps H and the side footboards 17 giving access to the vehicle door 6.

As is clear from the figure, the fascia 13 also comprises a surface portion 18 positioned above the bumper 16 and disposed inwards of the surface which frontally and laterally delimits the bumper.

In addition, each of the side portions 15 of the fascia 13 is substantially in contact with a corresponding vehicle mudguard 20. The fascia can comprise a plurality of discrete elements disposed substantially in contact with each other such as the bumper 16 and the footboards 17 plus suitable shielding panels arranged to shield substantially the entire surface delimited by the fascia contour, or alternatively said fascia can consist of a single element of plastics material which incorporates both the bumper 16 and the footboards 17 or at least some parts of the footboards. Conveniently the fascia, or at least some of its constituent elements, are constructed of plastics material.

The closed frame 5 of the side panel 4 of the driver compartment 3 has the same shape and dimensions for all cabs of the series. Thus all doors 6 also have the same dimensions. In order to form those cabs of the series which require longer lengths for the driver compartment 3, the various side panels 4 comprise, in addition to said frame and door, sidepieces 21 having the same height but different widths.

It is therefore apparent that each cab of the series comprises two parts with totally different functions, namely the compartment 3 for accomodating the vehicle driver, and the continuous fascia 13 for shielding the front and sides of the vehicle frame and certain of the mechanical members connected to it. When these latter are to be inspected, the driver compartment 3 is rotated about the shaft O while the fascia remains fixed to the frame.

Cabs of the series having different overall heights, indicated by $C_1$ and $C_2$, can therefore be obtained using driver compartments which always have the same height A. Thus little equipment is required to produce the cabs according to the invention as the closed frame 5 and door 6 have the same dimensions in all cases, and the side, front and rear panels are always of the same height. This useful result means that the volume of the store housing the parts required for satisfying vehicle production and subsequent spares requirements can be reduced.

Thus cabs of different overall height $C_1$, $C_2$, are obtained by forming continuous fascias of different heights $F_1$, $F_2$. The equipment required for forming such different-dimension fascias is however very simple and does not substantially increase the overall cost of the body-construction equipment.

In addition the shielding action provided by the continuous fascia 13 is very efficient as this latter comprises a central portion 14 and two side portions 15 which completely cover the corresponding front and sides of the frame 1, so giving it complete protection. It is apparent that modifications can be made to the cabs of the series according to the present invention, but without leaving the scope of the inventive idea.

What is claimed is:

1. A method of assembling a motor vehicle comprising the steps of:
    (a) providing a cab, said cab having a driver compartment (3), having a preselected and constant height (A), and including side panels (4), each side panel being defined by a closed frame (5) and a door (6), a front panel (7) and a rear panel (8);
    (b) providing a plurality of vehicle frames (1) each frame having a different height;
    (c) providing a plurality of shields, each shield having a different height (F1, F2) corresponding to the heights of the said vehicle frames and having a continuous fascia (13), a central portion (14) disposed below the front panel (7), and a pair of side portions (15) disposed under the side panels;
    (d) selecting one of said plurality of vehicle frames;
    (e) mounting said cab on said one vehicle frame;
    (f) selecting one of said plurality of shields, said one shield having a height corresponding to that of said one vehicle frame;
    (g) mounting said one shield to said one frame.

2. A method of assembling a motor vehicle according to claim 1 including the steps of:
    (a) incorporating in said fascia (13), a bumper (16), headlamps and side footboards (17) which give access to the doors (6).

3. A method of assembling a motor vehicle according to claim 1 including the steps of:
    (a) providing the fascia (13) with a surface portion (18) positioned above said bumper (16) and disposed inwards of the surface which frontally and laterally delimits the bumper.

4. A method of assembling a motor vehicle according to claim 1 including the steps of:
    (a) placing each of said fascia side portions (15) into contact with a corresponding vehicle mudguard (20)

5. A method of assembling a motor vehicle according to claim 1 including the steps of:
    (a) forming said fascia (13) as a single element of plastic material.

6. A method of assembling a motor vehicle according to claim 1 including the steps of:
    (a) providing said central portion (14) and side portions (15) as distinct elements;
    (b) joining the central portion and side portions together to form said continuous shield (13).

* * * * *

UNITED STATES PATENT AND TRADEMARK OFFICE
CERTIFICATE OF CORRECTION

PATENT NO. : 5,159,746
DATED : November 3, 1992
INVENTOR(S) : Luigi Saggese

It is certified that error appears in the above-identified patent and that said Letters Patent is hereby corrected as shown below:

On the title page, item [21]:
Filed: reads "Sep. 30, 1988" should be:

--Sep. 29, 1989--

Signed and Sealed this

Eleventh Day of January, 1994

Attest:

BRUCE LEHMAN

*Attesting Officer*   *Commissioner of Patents and Trademarks*